United States Patent [19]

Honjo

[11] Patent Number: 5,223,949
[45] Date of Patent: Jun. 29, 1993

[54] CODING MEANS FOR A SIGNAL PROCESSING SYSTEM

[75] Inventor: Masahiro Honjo, Sakai, Japan

[73] Assignee: Matsushita Electric Industrial Co., Ltd., Osaka, Japan

[21] Appl. No.: 870,250

[22] Filed: Apr. 17, 1992

[30] Foreign Application Priority Data

Apr. 18, 1991 [JP] Japan .................................. 3-86957

[51] Int. Cl.⁵ .............................................. H04N 1/00
[52] U.S. Cl. .................................................. 358/426
[58] Field of Search ............................... 358/426–427, 358/261.1–261.2; 382/56

[56] References Cited

U.S. PATENT DOCUMENTS

| | | | |
|---|---|---|---|
| 4,903,317 | 2/1990 | Nishihara et al. | 358/426 |
| 4,937,681 | 6/1990 | Fujinawa et al. | 358/426 |
| 5,068,745 | 11/1991 | Shimura | 358/426 |

Primary Examiner—Stephen Brinich
Attorney, Agent, or Firm—Willian, Brinks, Olds, Hofer, Gilson & Lione

[57] ABSTRACT

The coded signal is output with a frame sequence that differs from the frame sequence of the input video signal by outputting the frame information coded by in-frame or inter-frame coding before the frame information coded bay interpolation coding based on the successively preceding frames. Frames immediately preceding a scene change are coded by a method other than field interpolation coding, frames immediately after a scene change are coded by in-frame coding, and the coded information for the frame immediately after the scene change is output after the coded information for the frame immediately before the scene change.

5 Claims, 5 Drawing Sheets

CODING MEANS FOR A SIGNAL PROCESSING SYSTEM

BACKGROUND OF THE INVENTION

1. Field of the Invention

The present invention relates to a signal processing method for band compression of a video signal, and to a recording and reproducing device for recording and reproducing the band-compressed signal.

2. Prior art

There are six known methods of coding a video signal: in-frame or in-field coding, inter-frame or inter-field coding predicted from the preceding frame or field, and frame or field interpolation coding using information obtained by interpolation form the frame or field before and after the coded frame or field.

There are no problems with the use of either in-frame or in-field coding or inter-frame or inter-field coding because the frame sequence of the input video signal and the frame sequence of the encoded output signal are the same.

If the frame sequence of the input and output signals is kept the same during interpolation coding, in which the current field or frame is coded based on information interpolated form the fields or frames before and after the current field or frame is used, however, decoding of the output signal requires a buffer (frame memory) of sufficient capacity to hold the data for at least the plural frames required for interpolation.

SUMMARY OF THE INVENTION

The signal processing method of the present invention is therefore related to signal processing which performs band compression coding of a video signal by means of in-frame or in-field coding, inter-frame or inter-field coding predicted from the preceding frame or field, and frame or field interpolation coding predicted from the frame or field before and after the coded frame or field, and is comprised so as to output the coded signal with a frame sequence that differs form the frame sequence of the input video signal by outputting the frame or field information coded by in-frame or in-field coding or inter-frame or inter-field coding before the frame or field information coded by interpolation coding based on the successively preceding frames or fields, and, when a scene change occurs, to code the frame or field immediately preceding the scene change using a technique other than field interpolation coding, to code the frame or field immediately after the scene change by in-frame or in-field coding, and to output the coded information for the frame immediately after the scene change after the coded information for the frame immediately before the scene change is output.

It is thus possible to decode the coded signal with a buffer (frame memory) of minimal size.

Furthermore, it is possible to prevent the deterioration of image quality when the scene changes.

BRIEF DESCRIPTION OF THE DRAWINGS

The present invention will become more fully understood from the detailed description given below and the accompanying diagrams wherein.

DESCRIPTION OF PREFERRED EMBODIMENTS

The following description of the invention is restricted to the processing of frames to simplify the description, and the processing of fields is not specifically discussed.

Figure 1:
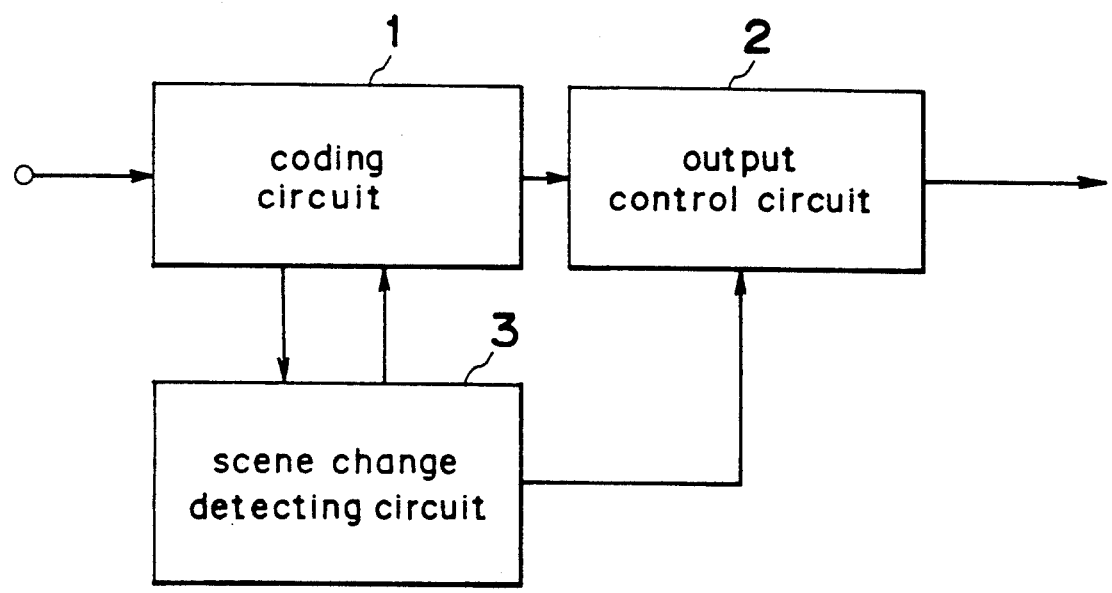
FIG. 1 is a block diagram of a first embodiment of the present invention.

The first embodiment of the invention is shown in FIG. 1.

The present invention comprises a coding circuit 1, output control circuit 2, and a scene change detection circuit 3.

The coding circuit 1 performs band compression coding by means of in-frame coding, inter-frame coding predicted form the preceding frame, and/or frame interpolation coding predicted from the frames before and after the coded frame. All or any one of these coding techniques may be used by the coding circuit 1.

The output control circuit 2 controls the sequence of the output information from the coding circuit 1 in frame units, and the scene change detection circuit 3 detects changes in the scene of the video image.

After the signal is coded through this construction, it is output with the frames in a sequence which is different from that of the input video signal because the frame information coded by in-frame coding or inter-frame coding is output before the frame or field information coded by interpolation coding based on the successively preceding frames.

In addition, when the scene changes, the frame immediately preceding the scene change is coded by a method other than field interpolation coding, the frame immediately after the scene change is coded by in-frame coding, and the coded information for the frame immediately after the scene change is output after the coded information for the frame immediately before the scene change is output.

Information for detecting scene changes, e.g., a difference signal for the pixels of the previous and present frames, is thus sent from the coding circuit 1 to the scene change detection circuit 3.

Figure 2:
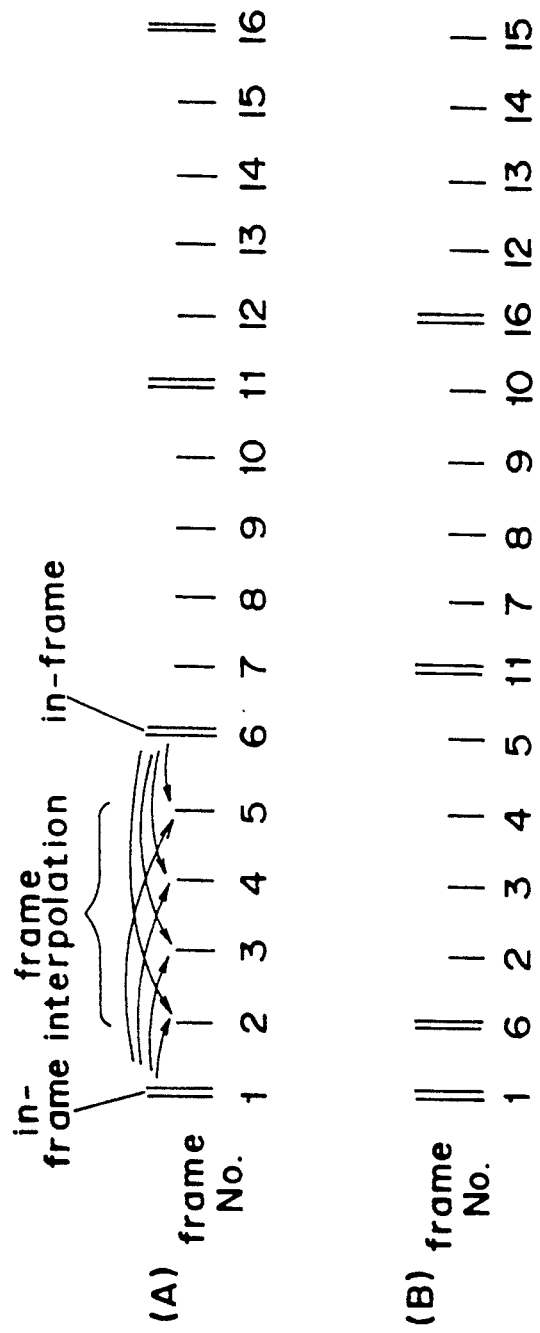
FIG. 2 illustrates the output sequence and coding techniques of a second embodiment of the present invention.

It is assumed hereinbelow that frames 1, 6, 11, and 16 of frames 1 - 16 in the input video signal are coded by in-frame coding, and the other frames are coded by frame interpolation coding as shown in FIG. 2 (A).

The information in frames 1 and 6 is therefore needed to decode frames 2-5.

When the coded output signal is output with the same frame sequence as that of the input signal, frames 1-6 can only be decoded if there is a frame memory with sufficient capacity to hold frames 1-6 in the decoder. In other words, decoding the signal requires a large buffer.

With the output sequence of the present invention, however, the coded signal is output in the frame sequence shown in FIG. 2 (B) because the frame coded by in-frame or inter-frame coding is output chronologically prior to the frame coded by frame interpolation coding using the successively preceding frames.

In this case, the buffer needed to decode the signal only needs to be large enough to hold two frames, i.e., frames 1 and 6.

Figure 3:
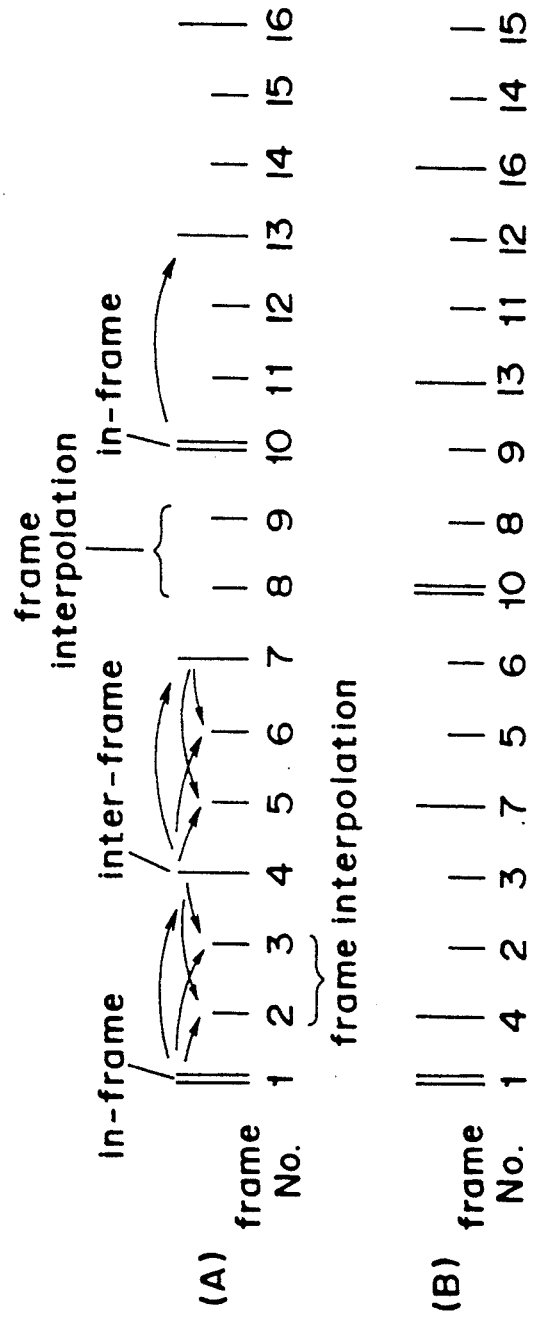
FIG. 3 illustrates the output sequence and coding techniques of a third embodiment of the present invention.

Referring to FIG. 3 (A), an alternative case in which three coding techniques, specifically in-frame, inter-frame, and frame interpolation coding, are used is described.

In-frame coding is used with frames 1 and 10, inter-frame coding is used with frames 4, 7, 13, and 16, and all other frames are coded with frame interpolation coding.

To decode frame interpolation-coded frames 2 and 3, the information for frames 1 and 4 is needed, and the information for frames 1, 2, and 3 must be held in memory until frame 4 is output. In other words, the minimum buffer size is that required to hold four frames of data.

In the output sequence of the invention, the buffer must only be large enough to hold frames 1 and 4, i.e., a two frame storage capacity, because the inter-frame coded frames are output before the frame interpolation-coded frames as shown in FIG. 3 (B).

When the scene changes, however, it is not desirable to use frame interpolation coding because there is no correlation between the screen images before and after the scene change.

Figure 4:
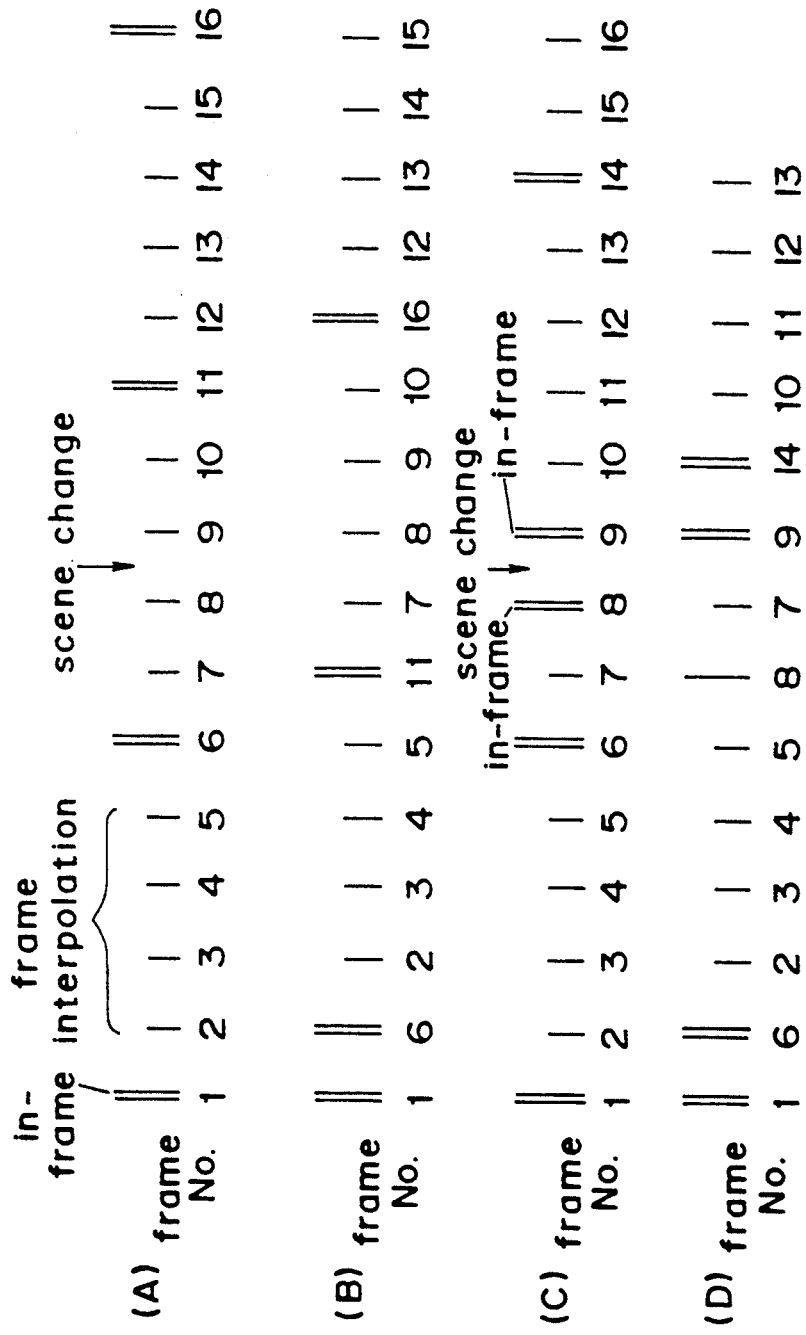
FIG. 4 illustrates the output sequence and coding techniques of a fourth embodiment of the present invention.

When the scene changes between frames 8 and 9 in FIG. 4 (A), the frames coded with frame interpolation coding, frames 7, 8, 9, and 10, will not be efficiently coded because there is no correlation to frames 6 and 11. Furthermore, the frame output sequence shown in FIG. 4 (B) is not the best possible sequence. It is therefore necessary to detect when there is a change in the scene.

This process is described next.

When the scene changes between frames 8 and 9 in FIG. 4, the frame (frame 8) immediately before the scene change is forcibly coded bay either in-frame or inter-frame coding, and the frame (frame 9) immediately after the scene change is coded by in-frame coding.

This case is illustrated in FIG. 4 (C). The signal coded by this method id output in the sequence shown in FIG. 4 (D).

The signal can thus be efficiently coded using the smallest possible frame buffer capacity of only two frames, and without using a frame correlation for coding frames before and after a scene change.

Scene changes are detected in this process by the scene change detection circuit 3 shown in FIG. 1. Scene changes are detected when the difference signal component for a number of pixels greater than the number of pixels in one screen expressing the differences between the previous and present frames exceeds a predetermined threshold value. This difference signal component is calculated for the previous and present frames by the coding circuit 1.

It is also conceivable that the coded signal will not be simply output, but will be recorded to an optical disk, video tape, or other recording medium. It would therefore be necessary to also read and reproduce the recorded signal.

Figure 5:
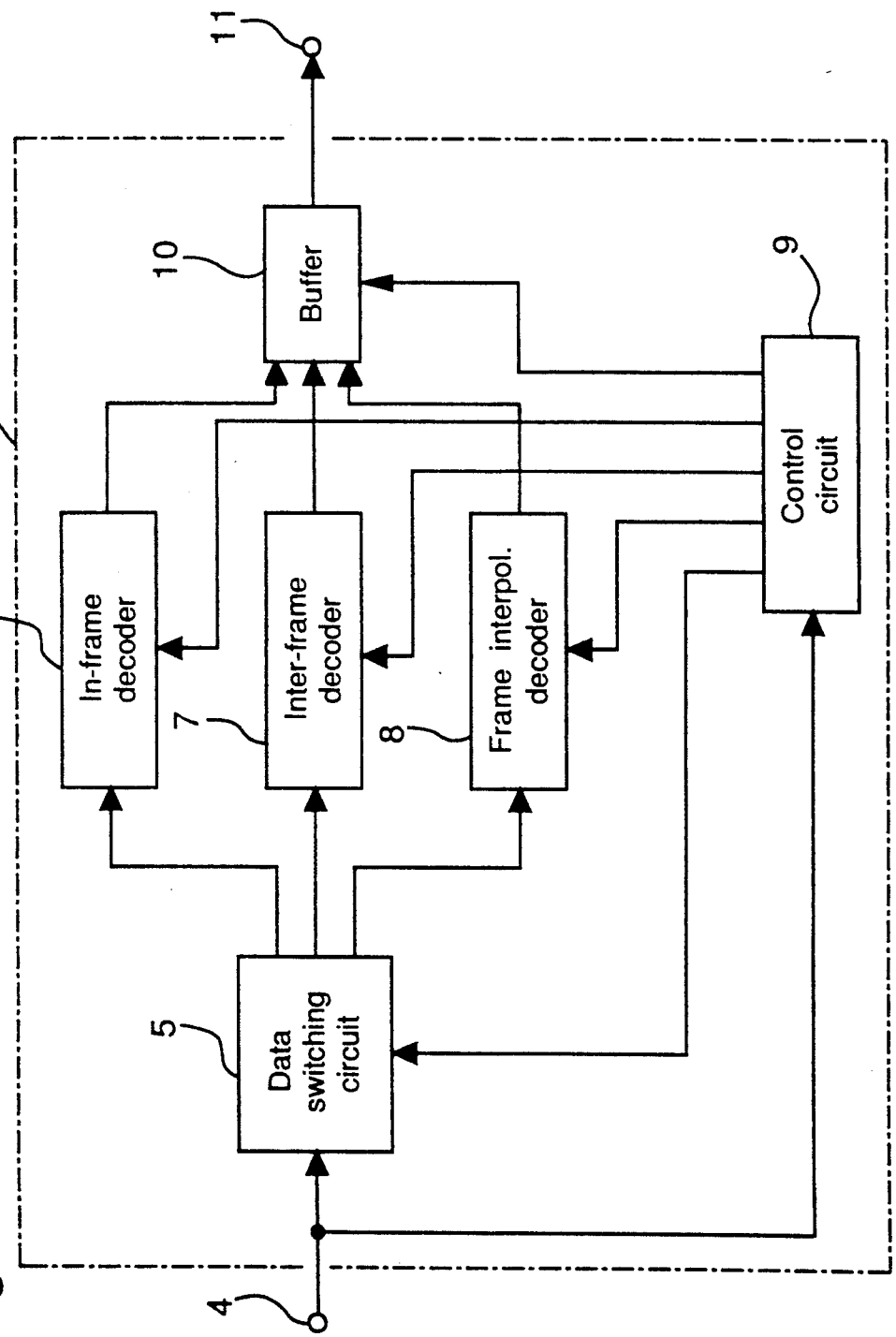
FIG. 5 is a block diagram of a decoding processing circuit for decoding signals coded according to the present invention.

FIG. 5 shows a block diagram of the decoding processing system 12 to be used for decoding the signal.

Data to be decoded which is input to the terminal 4 is input to the data switching circuit 5 and control circuit 9. The control circuit 9 reads the header information indicating various information on the data and controls other circuits contained in the decoding processing system 12 so as to perform predetermined processings on the data. More concretely, the control circuit 9 controls the data switching circuit 5 to send the in-frame coded data to the in-frame decoding circuit 6, inter-frame coded data to the inter-frame decoding circuit 8 and the inter-frame interpolation coded data to the inter-frame interpolation decoding circuit 8, respectively. These coded data are processed in respective circuits and, thereafter, the image information having been processed is output to the buffer circuit 10. Then, the image information is output form the buffer circuit 10 of which the output timing thereof is being controlled.

If the frame just after the scene change is in-frame coded forcibly, the header information of the data includes information indicative of the in-frame coding. Accordingly, the conventional decoding processing system can be used as it is by processing the data based on the information.

It will be known to those skilled in the art that a device which functions identically to the above description of the invention can be constructed with a minimal memory capacity for decoding, and can enable high quality decoding of the signal at scene changes.

It is to be noted that while the above description was limited for simplicity to frame processing, the same operation can be applied for field processing. The preceding description is applicable to this case by substituting "field" for "frame" in the above.

The invention being thus described, it will be obvious that the same may be varied in many ways. Such variations are not to be regarded as a departure form the spirit and scope of the invention, and all such modifications as would be obvious to one skilled in the art are intended to be included within the scope of the following claims.

What is claimed is:

1. A signal processing system comprising a coding means for band compression coding of an input video signal in units of a predetermined data length, said coding means selectively performing a first coding method in which coding is made using data within a unit selected form said units and a second coding method in which coding is made using data of the units precedent to the selected unit, and an output control means for controlling a sequence of output information from said coding means regarding said units, said output control means outputting said output information in such a sequence different from the sequence of the input video signal, such that the output information regarding the unit having been coded using said first coding method is output before the output information regarding the units having been coded using said second coding method is output.

2. The signal processing system according to claim 1 wherein said coding means performs further a third coding method in which coding is made using data of the units before and after the selected unit.

3. The signal processing system according to claim 2 wherein said system further comprises a scene change detection means for detecting scene changes and, when a scene change is detected, said coding means codes the unit immediately preceding the scene change with a method other than said third coding method and the unit immediately after the scene change with said first coding method, and said output control means outputs the coded information for the unit immediately after the scene change after the coded information for the unit immediately before the scene change is output.

4. The signal processing system according to claim 2, wherein said output control means outputs said output information regarding the unit having been coded using said first coding method before the output information regarding the units having been coded using said third coding method is output.

5. A decoding processing system for decoding coded data for a video signal, comprising;
   data switching means for sensing said coded data to a first, second, or third decoding means; and
   control means for controlling where said data switching means sends said coded data, based on information contained in said coded data, wherein the coded data sent to said first, second and third decoding means is decoded in said decoding means and image information contained in said decoded data is output to a buffer means.

* * * * *

UNITED STATES PATENT AND TRADEMARK OFFICE
CERTIFICATE OF CORRECTION

PATENT NO. : 5,223,949
DATED : June 29, 1993
INVENTOR(S) : Masahiro Honjo

It is certified that error appears in the above-indentified patent and that said Letters Patent is hereby corrected as shown below:

Claim 5, line 3, change "sensing" to --sending--.

Signed and Sealed this

First Day of May, 2001

Attest:

NICHOLAS P. GODICI

Attesting Officer      Acting Director of the United States Patent and Trademark Office